US009275025B2

(12) United States Patent
Mitnick et al.

(10) Patent No.: US 9,275,025 B2
(45) Date of Patent: Mar. 1, 2016

(54) INTERACTIVE SPECIAL PASTE

(75) Inventors: Victor Mitnick, San Carlos, CA (US);
Jay London, Pleasanton, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1006 days.

(21) Appl. No.: 11/120,637

(22) Filed: Apr. 29, 2005

(65) Prior Publication Data

US 2014/0250369 A1 Sep. 4, 2014

(51) Int. Cl.
*G06F 17/00* (2006.01)
*G06F 17/24* (2006.01)

(52) U.S. Cl.
CPC ...................................... *G06F 17/24* (2013.01)

(58) Field of Classification Search
USPC .......................................... 715/255, 724, 770
See application file for complete search history.

(56) References Cited

U.S. PATENT DOCUMENTS

| | | | | |
|---|---|---|---|---|
| 6,583,798 | B1 * | 6/2003 | Hoek et al. ..................... | 715/822 |
| 6,912,690 | B2 * | 6/2005 | Bauchot ........................ | 715/220 |
| 6,944,821 | B1 * | 9/2005 | Bates et al. ..................... | 715/209 |
| 6,968,504 | B2 * | 11/2005 | Broman et al. ................. | 715/234 |
| 7,546,522 | B2 * | 6/2009 | Tolle et al. ..................... | 715/215 |
| 8,392,844 | B2 * | 3/2013 | Rogers ................... | G06F 17/218 |
| | | | | 715/235 |
| 2004/0172584 | A1 * | 9/2004 | Jones et al. ..................... | 715/500 |
| 2005/0149871 | A1 * | 7/2005 | Broman et al. ............... | 715/724 |
| 2006/0041589 | A1 * | 2/2006 | Helfman et al. ............ | 707/104.1 |
| 2006/0053383 | A1 * | 3/2006 | Gauthier et al. .............. | 715/764 |

OTHER PUBLICATIONS

Stylos, Jeffrey et al., "Citrine: Providing Intelligent Copy-and-Paste", Copyright 2004, vol. 6, Issue 2.*
CustomGuide, Inc, "Excel 2003 Personal Trainer", Nov. 19, 2004, Chapter 2, Section 7, pp. 1-4.*
CustomGuid, Inc. "Excel 2003 Personal trainer", Nov. 19, 2004 Chapter 2, Section 7 (p. 76), Number of pp. 1.*
Title: HTML Formatter, Date Nov. 1, 2001, Publisher: IBM technical Disclosure Bulltein, Issue No. 451, p. 1947.*
W3C, Cascading Style Sheets, level 1 (W3C Recommendation Dec. 17, 1996, revised Jan. 11, 1999), available at http://www.w3.org/TR/1999/REC-CSS1-19990111 (1999).
Kyrnin, Jennifer, "The Difference Between CSS and XSLT," About. com, available at http://webdesign.about.com/library/weekly/aa101901a.htm (last accessed Mar. 6, 2011).

(Continued)

*Primary Examiner* — Scott Baderman
*Assistant Examiner* — Mustafa Amin
(74) *Attorney, Agent, or Firm* — Kilpatrick Townsend & Stockton LLP (57) ABSTRACT

A special paste feature presents a variety of options to a user for choosing the appearance of the pasted object or objects. When the user selects to specially paste the object, an interface is presented for the user to select from a variety of styles and format codes or predefined groups thereof to keep in the pasted object. Once the user selects the level of structure and formatting that he or she desires to import into the target document, the object will be copied into the target document or application using only the structure and formatting selected to remain by the user.

19 Claims, 4 Drawing Sheets

(56) References Cited

OTHER PUBLICATIONS

W3C, XSL Transformations (XSLT), W3C Recommendation Nov. 16, 1999, available at http://www.w3.org/TR/1999/REC-xslt-19991116 (1999).

Radiya, Ashvin and Dixit, Vibha, The basics of using XSM Schema to define elements, available at http://www.ibm.com/developerworks/library/xml-schema/ (dated Aug. 1, 2000).

* cited by examiner

INTERACTIVE SPECIAL PASTE

TECHNICAL FIELD

The present invention relates, in general, to computer-based user interfaces, and, more specifically, to a special paste feature.

BACKGROUND OF THE INVENTION

One of the earliest and most popular applications that became widely used among non-technical computer users was the word processor. Computers were naturally suited for word processing with their memory and display features that allow authors to draft, edit, correct, and the like without requiring numerous hard copies or lengths of erasing tapes or substances, or carbon paper. A useful set of features that developed in word processing is the cut, copy, and paste functions. Cut, copy, and paste allowed word processing users to identify a selection of text, place a copy of that text on a memory location, sometimes referred to as a clipboard, and then insert that text, or a copy of that text at any desired insertion point in the document under construction. This process allowed authors to more efficiently create their documents.

The usefulness and efficiency of cut, copy, and paste, however, was seen beyond word processing applications and eventually extended across the entire computer platform. Selections of objects or elements may now be made in one application, a copy placed onto the clipboard, and then the copied object or element inserted at any point in most other development environments. Individual applications have cut, copy, and paste functionality that interoperates with the cut, copy, and paste utilities of the resident operating system. One problem that developed with cross-application copying is the representation of incompatible or inconsistent formatting or styling. For example, some word processing programs have proprietary styling codes. If the text associated with the proprietary styling is pasted into an application that does not support that styling, the text will not appear as it did in the original application. One solution that was typically used was to copy the selected text from the word processing application, such as Microsoft Corporation's WORD™, to a simple text editor, and then copy the selection from the text editor into the target application. Because the simple text editor stripped all of the extra formatting that is particular to WORD™, it would not be included in the selection eventually copied into the target application. However, these extra steps take valuable time away from developers.

Another solution was developed that allowed the user to select options when pasting the object into the target application. A special paste operation in certain applications, such as Macromedia, Inc.'s DREAMWEAVER™ Web application development environment, or Microsoft Corporation's OFFICE™ productivity suite of applications, gives the user options to select to keep only the text portion of the object, or attempt to keep the formatting of the original document. This selection of functionality allows more flexibility to the user, but does not address the more-intense styling problems that may be encountered when copying hypertext markup language (HTML) objects or elements, or other such meta language-based or supplemented objects or elements. However, even in some of the options to import only the text, simple formatting may remain, which could differ from application to application.

In HTML or other markup or meta languages, such as extensible markup language (XML), and the like, a multitude of styling possibilities exist that may be controlled through in-line style tags and attributes or through association with a style sheet, such as cascading style sheets (CSS). Completely stripping the styling or formatting or attempting to completely match the target styling or formatting may leave the developer a considerable amount of work in cleaning up the copied object or elements. This amount of work may lead the developer to code the object from scratch instead of taking advantage of the more efficient means, such as the cut, copy, paste functionality.

BRIEF SUMMARY

Representative embodiments of the present invention provide a specialized paste feature that presents a variety of options to a user for choosing the appearance of the pasted object or objects. Objects that are copied from the same or different application are placed in a clipboard along with all of the object's styling and formatting codes. When the user selects to specially paste the object, an interface is presented to the user to select from a variety of choices in which the user can select various style and format code to keep in the pasted object and which code may be disregarded. Some of the selection choices are especially relevant to Web development and other Web development languages, such as HTML, and the like. The user may select from predefined groups of code or preferences to keep, or may access more detailed interface elements to select very specific codes or tags to keep or ignore in the pasted version of the object. Once the user selects the level of structure and formatting that he or she desires to import into the target document, the object will be pasted into the target document or application using only the structure and formatting selected to remain by the user. The remaining codes or tags will be stripped form the copied object or element.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
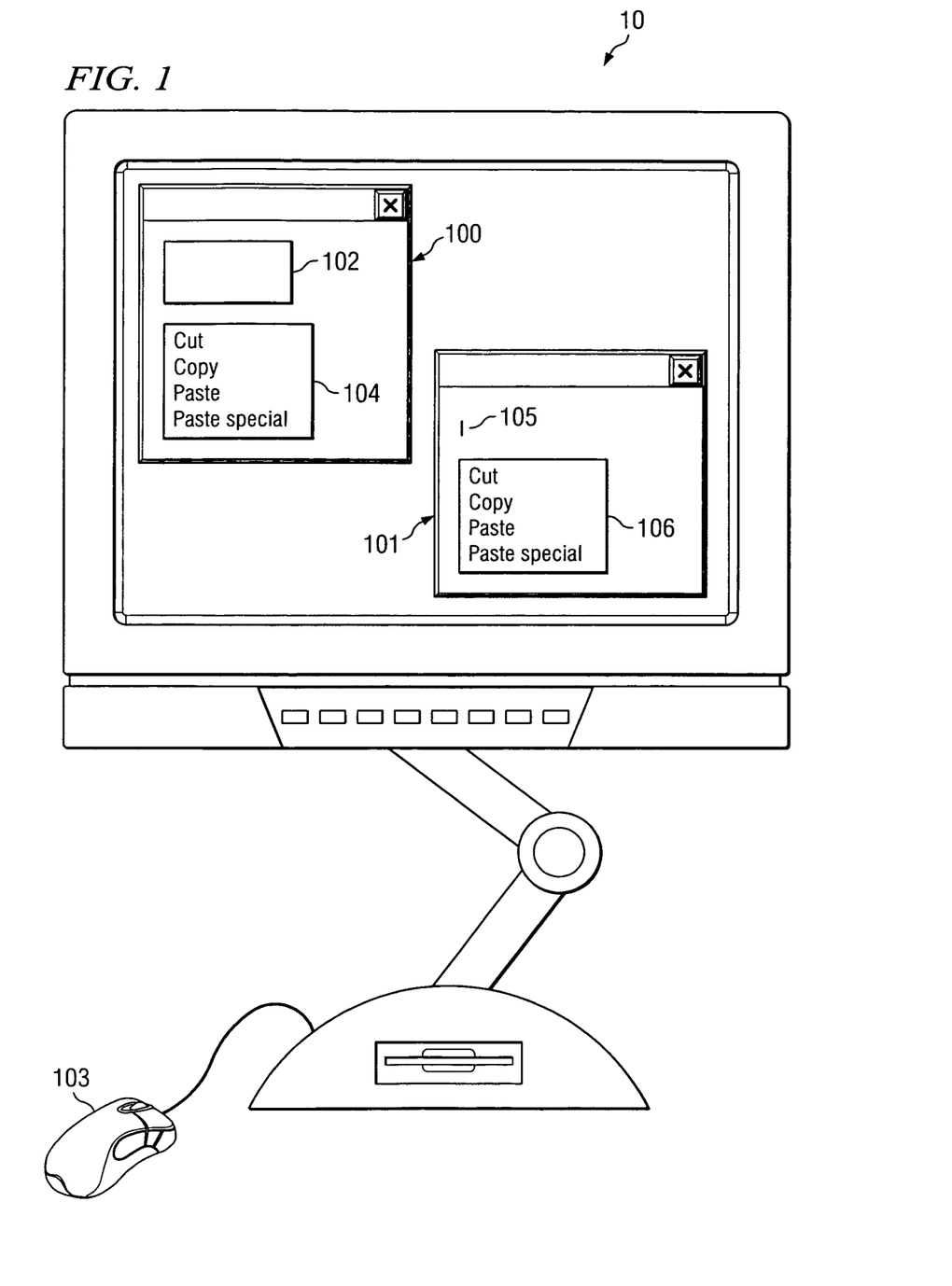
FIG. 1 is a block diagram illustrating a computer operable to perform functions according to one embodiment of the present invention.

FIG. 1 is a block diagram illustrating computer 10 operable to perform functions according to one embodiment of the present invention. Computer 10 is running two separate applications, word processor 100 and Web design application 101. Word processor 100 may be any of a number of different word processing applications, such as WORD™, Corel Corporation's WORDPERFECT™, and the like, while Web design application may be any of a number of such applications, such as DREAMWEAVER™, Adobe Systems, Inc., GOLIVE™, Microsoft Corporation's FRONTPAGE™, or the like. Web design application 101 includes cut, copy, and paste features that are configured according to one embodiment of the present invention.

It should be noted that the various embodiments of the present invention are not limited only to operating in conjunction with word processing applications, such as word processor 100. The present invention may be used with any application that includes displayed text. Examples of such applications are text editors, email clients, Web browsers/Web pages, utility applications, and the like.

In creating a Web application in Web design application 101, the developer wishes to insert an object, object 102, being displayed on word processor 100. The developer selects object 102 using pointing device 103 and then calls up action pop-up window 104, which includes options for cut, copy, and paste. The user selects to copy object 102. By selecting this copy option, a copy of object 102 is placed in the memory of computer 10 in a place defined as the clipboard. The content of object 102 is placed in the clipboard in addition to any supporting code, such as formatting, styling, and the like.

The developer then positions an insertion point in Web design application 101 at point 105. The developer would then select the paste special option from action pop-up window 106. The developer/user wishes to copy object 102 into Web design application 101, but wishes to copy only some of the formatting associated with object 102. By selecting the paste special option, the user will then be presented a dialog box which will provide an interface for the user's selections.

In operation, a developer may select a group of text in word processor 100 that he or she may desire to insert into a Web page being created in Web design application 101. The paste function in Web design application 101 is aware that it creates HTML documents for display in standard Web browsers. Therefore, when the developer selects to paste the plain text into the Web page, it will automatically convert the plain text into HTML.

It should be noted that in various development environments that employ alternative and/or additional embodiments of the present invention, there is a design view mode, which is a graphical canvas for graphically developing the application, and a code view mode, which is a text editing canvas for developing the code of the application. In such embodiments, when the user pastes text into the design view, the text is converted into HTML. When the user pastes text into the code view, the text will be pasted as plain text. Examples of such development environments are Web development environments, Rich Internet Application (RIA) development environments, software development environments, and the like.

In selected word processing environments, such as WORD™, the clipboard for saving cut or copied selections includes an HTML version. Thus, when copying text from WORD™ and pasting it into Web design application 101, the paste function of Web design application 101 will select the HTML version already on the WORD™ clipboard. No HTML generation would be required. However, WORD™ sometimes includes some proprietary or non-standard HTML tags. The paste functionality configured according to one embodiment of the present invention will examine the non-standard HTML tags and either convert those to standard HTML or strip those tags from the pasted object.

An additional feature that is associated with the use of this cut, copy, and paste feature in Web development environments is the treatment of Cascading Style Sheet (CSS) code. CSS is a style sheet language that is used to define the style and formatting of HTML in a manner that is separate from the structure defined by the inline HTML tags. CSS allows for a centralized styling system that separates styling and structure, which provides a more flexible styling ability. CSS may be included in inline tags or code as HTML style attributes, embedded in the head of an HTML document (i.e., head or document code), and/or by creating a separate CSS file that is referred to and/or applied against the one or more Web documents that the CSS is associated with. In additional and/or alternative embodiments of the present invention, CSS code is copied into the clipboard with its associated elements or objects. Many existing applications allow for the CSS to be copied into the clipboard in this manner. The various embodiments of the present invention that include CSS capabilities, then allow the developer/user to select the level of CSS styling to maintain or delete from the imported or pasted elements.

In one embodiment of such CSS-capable paste features, only inline CSS is copied into the clipboard, processed according to the selections by the user of which styling to maintain, and then paste the object along with the selected CSS code inline with the element. Other alternative embodiments provide for copying the relevant CSS code from the associated, but separate, CSS file into the clipboard. After processing out the styling code the developer has not selected to maintain, the CSS may be pasted into the target document inline with the pasted object or elements, or alternatively, the CSS may be added to an associated CSS style sheet file. Various embodiments may allow for the developer to select the method for including the maintained CSS code.

It should be noted that in additional and/or alternative embodiments, styles that describe a selected object in word processor 100 may be converted to CSS code when pasted into Web design application 101 from any format that existed in word processor 100, including, but not limited to HTML, XML, Rich Text Format (RTF), or the like. The described alternative embodiment of the present invention incorporated into Web design application 101 would detect the word processing styles associated with the selected objects or elements within word processor 100 and convert the styles that the developer indicated to maintain into CSS code to be added when the object or element is pasted into the target document in Web design application 101.

It should further be noted that the various embodiments of the present invention may apply to copying and pasting differently formatted objects or elements from a source document in one application to a target document in the same or different application. Such objects or elements may comprise text, images, animations, sounds, or other multimedia formats. The present invention is not limited only to the use of text.

Figure 2:
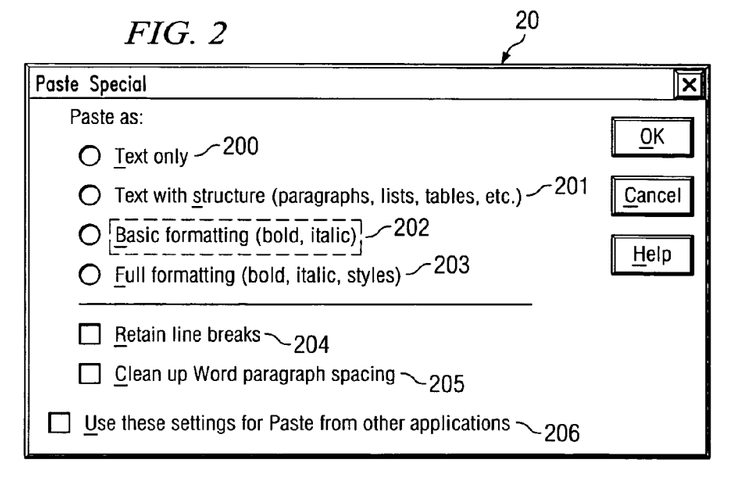
FIG. 2 is a diagram illustrating a dialog box presented by the Web design application shown in FIG. 1 and configured according to one embodiment of the present invention.

FIG. 2 is a diagram illustrating dialog box 20 presented by Web design application 101 (FIG. 1) configured according to one embodiment of the present invention. Dialog box 20 is displayed to a developer/user in response to a paste special selection, such as described with regard to FIG. 1. Dialog box 20 presents multiple formatting group selections that determine what formatting or styling code associated with a copied object, such as object 102 (FIG. 1) will be included when the object is copied into the target application, such as Web design application 101 (FIG. 1).

"Text only" selection 200 instructs the application to strip off all formatting, styling code, CSS and the like within object 102 except for the actual text. "Text with structure" selection 201 instructs the application to maintain the codes and tags that affect the structure of object 102, such as the paragraphs, lists, tables, and the like. "Basic formatting" selection 202 instructs the application to preserve the structural formatting that was retained in selection 201, along with a subset of the code that specifically provides for bold and italic styling, and a few other codes, such as horizontal rules, images and other objects, image maps, form tags, and the like. All other formatting and style code or tags and CSS rules will be stripped from object 102 prior to pasting it into the target application. "Full formatting" selection 203 instructs the application to preserve all style formatting, such as bold, italic, underline, and other styles and style sheets, such as all CSS styling.

It should be noted that in additional and/or alternative embodiments of the present invention, when "text only" selection 200 is selected, the system retrieves the plain text version of object 102 from the clipboard storage location. These embodiments rely on the source application's and/or the operating systems clipboard utility. In some examples, such as in Microsoft products, both a plain text version and an HTML version of a copied selection is saved onto the clipboard. The described embodiments of the present invention may selectively choose which of the versions in the clipboard to retrieve for the paste feature.

Dialog box 20 also provides options that may be used to clean up the formatting or styling of object 102. For example, in some email applications, when the text wraps to a next line, a line break is inserted into the body of the email text. When inserted into some target applications, these line breaks appear as separate paragraphs, which, when viewed by a developer/user, appears to be displayed incorrectly. "Retain line breaks" selection 204 will determine whether these lines breaks will be kept in the pasted object or whether they will be stripped.

Similarly, some applications treat formatting in special, proprietary ways. When copied and pasted into an incompatible application, these special, proprietary styling or formatting codes may be misinterpreted or not interpreted at all. One application that includes such specialized formatting and styling codes is WORD™. "Clean up WORD™ paragraph spacing" selection 205 allows the developer/user to instruct the application to analyze the block making up object 102 to automatically determine structural or formatting instructions that may be retained and which ones may be stripped. For example, in WORD™, many people type text and only hit the return key when a new paragraph is desired. In contrast, some people type a line of text, press the return key to move to the next line and then press the return key multiple times to represent a new paragraph. However, the code associated with this text will show a new paragraph after every line and several paragraphs between actual paragraphs. When a developer selects "Clean up WORD™ paragraph spacing" selection 205, the system looks over object 102 to determine the line spacing, the number of returns between each line and other similar visual-related information, in order to determine what type of formatting or styling should be applied to object 102.

For example, if the section of the text being examined is ten lines long, with a carriage return, i.e., paragraph tag around each line and two, consecutive paragraph tags between the ten lines and the next set of lines, an algorithm within the system determines that the ten lines are meant to be a paragraph and strips all of the formatting that is present and generates new formatting that surrounds the entire ten lines with a single paragraph tag set.

Dialog box 20 also presents an option to the developer/user to save the pre-grouped paste selection as the default for the next paste selection. This selection, "Use these settings for Paste from other applications" selection 206, allows the user to set the default "Paste" command actions. The ability to set the selected options as the default "Paste" functionality, allows the developer/user to more efficiently perform repetitive tasks in cutting/copying and pasting. Instead of selecting "Paste Special" and selecting the specific pre-grouped paste selections each time, the developer would set the default, and simply select the "Paste" option, which will automatically execute the paste function according to the default settings.

Figure 3:
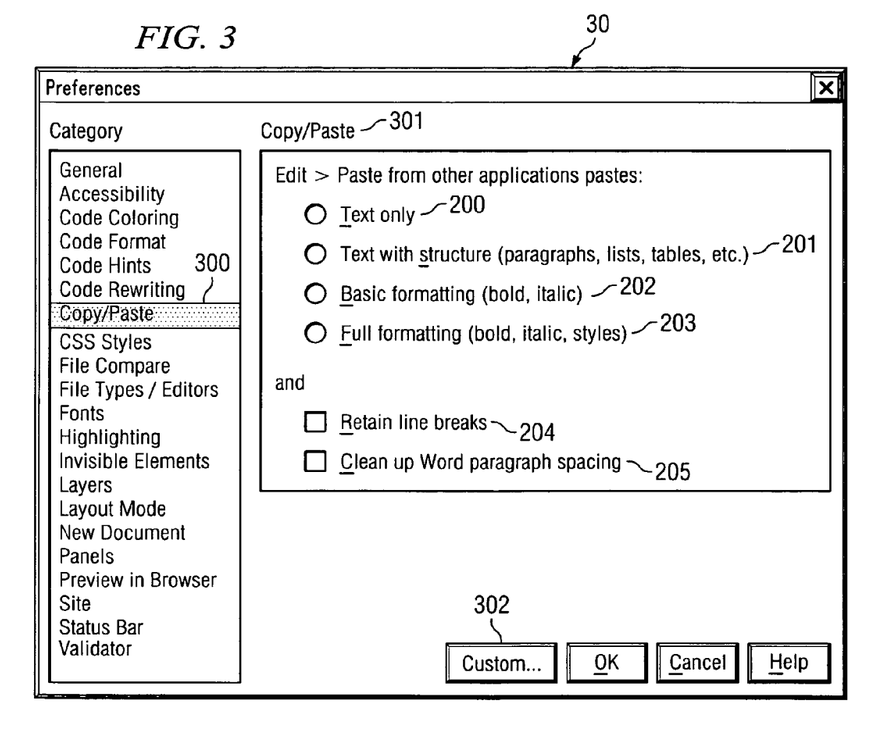
FIG. 3 is a diagram illustrating a preference window configured according to one embodiment of the present invention.

FIG. 3 is a diagram illustrating preference window 30 configured according to one embodiment of the present invention. As noted with regard to "Use these settings for Paste from other applications" selection 206 (FIG. 2) the developer/user may selectively set the attributes of the default "Paste" function. This ability to set the default functionality is also available independently from dialog box 20 presented in response to a "Paste Special" command, as illustrated in FIG. 2. The developer/user may select a "Preferences" menu choice to bring up preference window 30. Preference window 30 provides a graphical interface for the developer to enter global preferences of attributes and properties of the application it is associated with, such as Web design application 101 (FIG. 1).

The developer/user selects Copy/Paste category 300 to set the parameters for the default "Paste" functionality. Responsive to this selection, preference window 30 displays the pre-defined group formatting selections that are available for the user to choose. In the example depicted in FIG. 3, group formatting selections 200-205 are the same group formatting selections presented in dialog box 20 (FIG. 2). The developer/user may select the various combinations of predefined groups to set the default functionality of the "Paste" feature.

Figure 4:
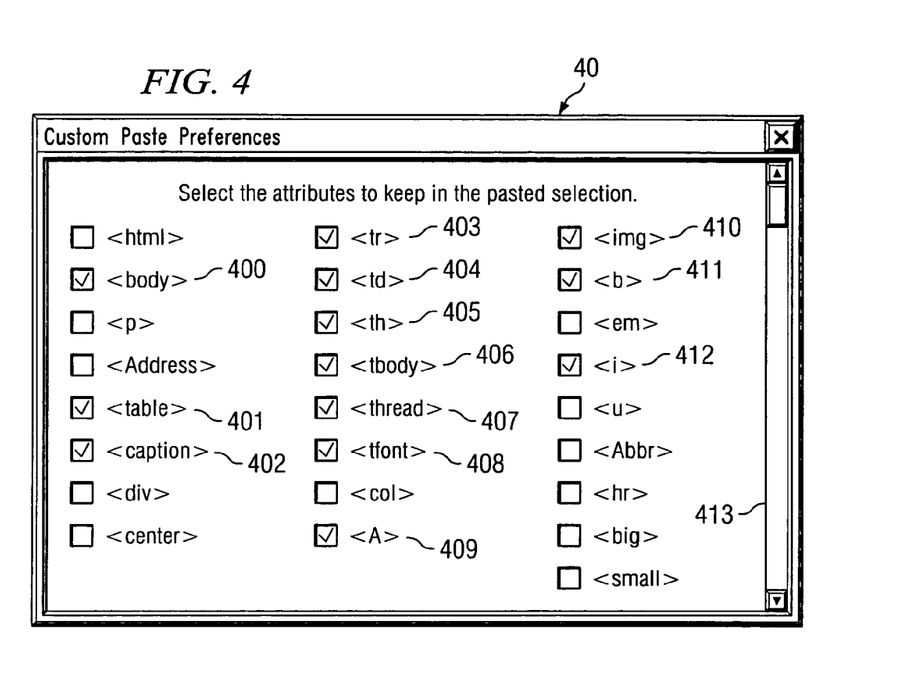
FIG. 4 is a diagram illustrating a Custom Paste Preferences window presented by an application configured according to another embodiment of the present invention.

FIG. 4 is a diagram illustrating Custom Paste Preferences window 40 presented by an application configured according to another embodiment of the present invention. The example embodiments described with regard to FIGS. 2 and 3 each provide a set of pre-defined formatting groups that the user may select. Simply by selecting one or more check boxes or selection means, the application sets a series of specific and associated tags or formatting codes to be stripped and/or maintained in the pasted elements or objects. In additional and/or alternative embodiments of the present invention, a detailed interface may be presented to a developer or user to select individual tags or formatting codes to maintain or strip from the element or object pasted from the clipboard. Custom Paste Preferences window 40 is the user interface presented to a developer in an application having such feature in another embodiment of the present invention.

Custom Paste Preferences window 40 include a long list of tags and formatting codes that the developer may individually select. Once selected, the application will maintain only the formatting tags or code that the user has selected in Custom Paste Preferences window 40. In the illustrated example, the user has selected to maintain, at least, the table elements, table tags 401-408, anchor <a> tag 409, image <img> tag 410, bold <b> tag 411, and italics <i> tag 412. Typically, a large number of formatting tags exists, such that scroll bar 413 is used to scroll among the various formatting code or tag selections.

It should be noted that in additional or alternative embodiments of the present invention, the detailed selections provided on Custom Paste Preferences window 40 may be made an optional interface item to Preferences window 30 (FIG. 3) through some selection means, such as "Custom . . . " button 302. Alternatively, it may be a completely separate and independent interface element from any other preference interface.

Figure 5:
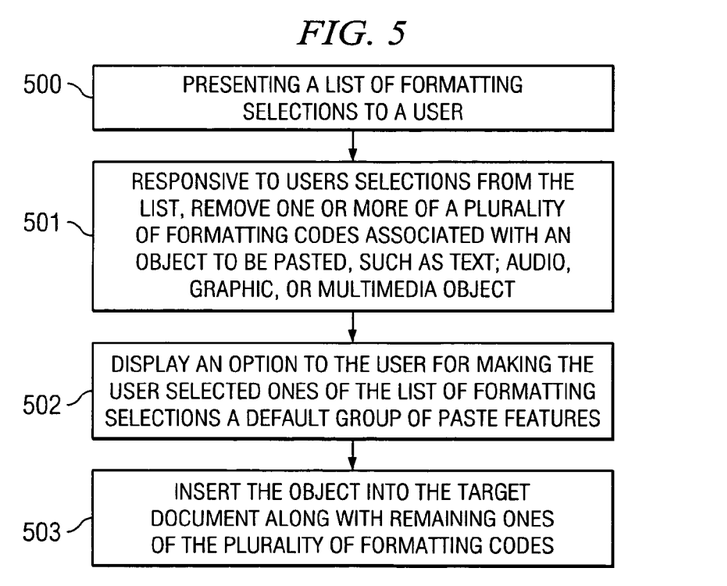
FIG. 5 is a flowchart illustrating example steps executed in implementing one embodiment of the present invention.

FIG. 5 is a flowchart illustrating example steps executed in implementing one embodiment of the present invention. In step 500, a list of formatting selections is presented to a user. Responsive to user's selections from the list, in step 501, remove one or more of a plurality of formatting codes associated with an object to be pasted, such as text; audio, graphic, or multimedia object. Display an option to the user, in step 502, for making the user-selected formatting selections a default group of paste features. In step 503, insert the object into the target document along with remaining ones of the plurality of formatting codes.

The program or code segments making up the various embodiments of the present invention may be stored in a computer readable medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 6:
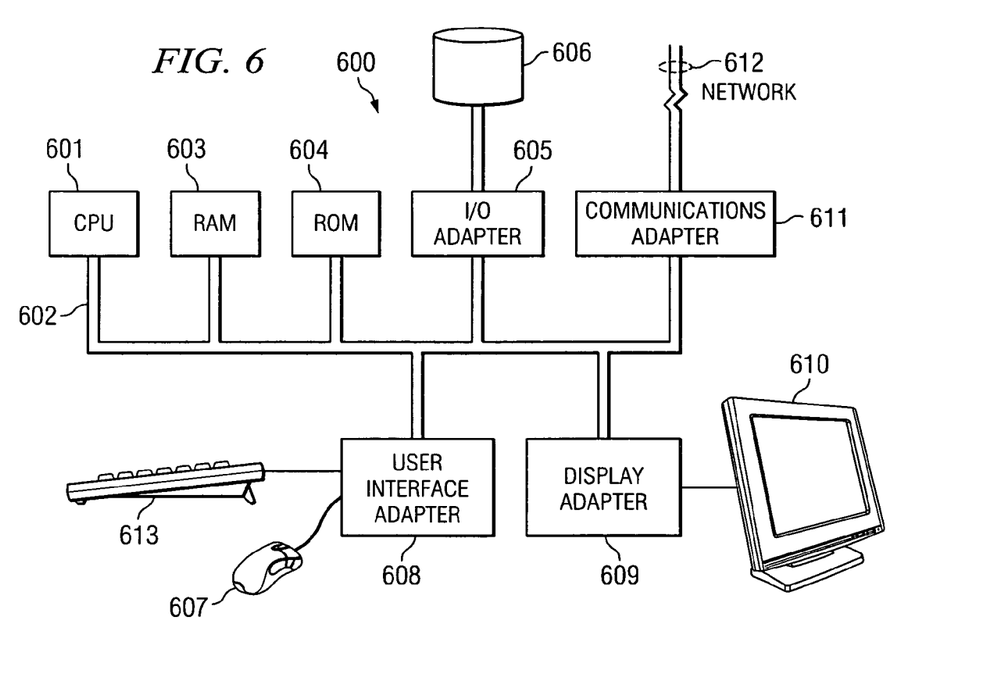
FIG. 6 illustrates a computer system adapted to use embodiments of the present invention.

FIG. 6 illustrates computer system 600 adapted to use embodiments of the present invention, e.g. storing and/or executing software associated with the embodiments. Central processing unit (CPU) 601 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, and the like, to the computer system 600. The display card 609 is driven by CPU 601 to control the display on display device 610.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system comprising:
    memory coupled to a central processing unit (CPU);
    a clipboard memory defined within said memory; and
    an application configured to display text on a display device, said application stored in said memory, wherein, when executed by said CPU, said application comprises:
        a copy function configured to store a copy of text and a plurality of formatting instructions representing formatting applied to said text into said clipboard memory, each formatting instruction affecting a visual characteristic or said text, the formatting instructions comprising a cascading style sheet (CSS) instruction originating from a location associated with a source document, the location comprising document code of the source document, inline code of the source document, or a CSS file associated with the source document;
        a dialog box displayed in response to a paste feature selection, said dialog box displaying a plurality of formatting code options corresponding to at least some of the formatting instructions representing the formatting applied to said text, wherein selection of one or more of said plurality of formatting code options identifies one or more of said plurality of formatting instructions to remove from said copied text when said copied text is pasted from said clipboard into a target document;
        a paste function configured to identify which of the one or more formatting code options were identified for removal and paste the copy of the text with each of the plurality of formatting instructions except for the formatting code options that were identified for removal; and
        a default option displayed on said display device, wherein said default option is configured to make said selected one or more of said plurality of formatting code options a default paste action.

2. The system of claim 1 wherein said plurality of formatting code options comprises:

a predefined group of formatting tags; and
a plurality of individual formatting tags.

3. The system of claim 1 wherein said executed application further comprises:
a clean up option displayed within said dialog box, wherein said clean up option is configured to replace one or more of:
one or more proprietary formatting tags, and
one or more non-standard formatting tags
with corresponding one or more standard formatting tags.

4. The system of claim 1 wherein said copied text is pasted into said target document in hypertext markup language (HTML).

5. The system of claim 1 wherein said executed application further comprises:
a conversion feature configured to convert remaining ones of said plurality of formatting instructions not removed from an original format into a new format, wherein said new format comprises one of:
hypertext markup language (HTML);
extensible markup language (XML);
extensible styles sheet language (XSL); and
cascading style sheets (CSS).

6. The system of claim 1 wherein said remaining ones of said plurality of formatting instructions not removed include One or more CSS instructions.

7. The system of claim 6 wherein, responsive to said copied object being pasted into said target document, said one or more CSS instructions are pasted into one or more of:
head code in said target document;
inline code in said target document; and
in a CSS file associated with said target document;
wherein said one or more CSS instructions originates from on of:
head code in a source document of said copied object;
inline code in said source document of said copied object; and
a CSS file associated with said source document.

8. The system of claim 1, wherein the dialog box is displayed after the paste feature selection but before the copy of the text is pasted, and
wherein the paste function is configured to paste the copy of the text with each of the plurality of formatting instructions except for the formatting code options that were identified for removal after the dialog box is displayed.

9. The system of claim 1 wherein the formatting instructions comprise tags applied to said text, wherein the formatting code options identify in the dialog box at least some of the tags applied to said text.

10. The system of claim 9 wherein selection of each of said plurality of formatting code options identifies one or more tags to remove from said copied text when said copied text is pasted from said clipboard into a target document.

11. The system of claim 9 wherein the tags comprise Hyper Text Markup Language (HTML) tags.

12. A computer program product comprising a non-transitory computer-readable medium embodying computer program logic, the computer program product comprising:
program code for designating a memory location accessible by a processor included in a computing system as a clipboard;
program code for copying an object and a plurality of styling or formatting codes associated with the object to the clipboard; and
program code for causing the computing system to, in response to a paste command:
provide an interface identifying at least some of the plurality of styling or formatting codes associated with the object, the interface allowing individual selection of one or more of the plurality of styling and formatting codes to select which of the one or more of the plurality of styling and formatting codes will be provided, and receiving a selection choice via the interface, the selection choice identifying a subset of the plurality of styling or formatting codes for inclusion while pasting, the subset of the plurality of styling or formatting codes comprising a cascading style sheet (CSS) instruction originating from a location associated with a source document for the object, the location comprising document code of the source document, inline code of the source document, or a CSS file associated with the source document, and
paste the object from the clipboard into a target document, wherein pasting includes providing the object and only the style or format codes of the subset,
wherein the computer-readable medium comprises an electronic circuit, a memory device, a flash memory, a ROM, an erasable ROM, a floppy diskette, a compact disk CD-ROM, and optical disk, or a hard disk.

13. The computer program product set forth in claim 12, further comprising:
program code for providing an interface for receiving selection of a choice for cleaning up the styling or formatting codes associated with the object.

14. The computer program product forth in claim 13, wherein cleaning up comprises:
removing one or more non-standard styling or formatting codes; and
replacing the removed one or more non-standard styling or formatting codes with corresponding standard styling or formatting codes.

15. The computer program product set forth in claim 13, wherein cleaning up comprises:
determining a structure of the object based on the plurality of styling or formatting codes associated with the object;
replacing the styling or formatting codes with new styling or formatting codes according to the determined structure.

16. The computer program product set forth in claim 12, wherein pasting comprises inserting the CSS instruction in a location associated with the target document for the pasted object, the location comprising document code of the target document, inline code of the target document, or a CSS file associated with the target document.

17. The computer program product set forth in claim 12, further comprising:
program code for presenting an option to save data identifying the subset as a default paste action.

18. A computer-implemented method, comprising:
designating a memory location as a clipboard, the memory location accessible by a processor included in a computing system;
using the processor, copying an object and a plurality of styling or formatting codes associated with the object to the clipboard; and
in response to a paste command received after the object and plurality of styling or formatting codes have been copied with the object to the clipboard:
using the processor, providing an interface identifying at least some of the plurality of styling or formatting codes associated with the object and receiving a selection choice via the interface, the selection choice identifying a subset of the plurality of styling or formatting codes for inclusion while pasting, the subset of the plurality of styling or formatting codes comprising a cascading style sheet (CSS) instruction originating from a location associated with a source document for the object, the location comprising document code of the source document, inline code of the source document, or a CSS file associated with the source document; and using the processor, pasting the object from the clipboard into a target document in a target application, wherein pasting comprises providing the object and providing only the style or format codes of the subset for use by the target application in using the style or format codes of the subset to apply a style or formatting to the object.

19. The method of claim 18, wherein pasting occurs after the interface has been provided.

\* \* \* \* \*